3,377,343
2',2' - BISTRIFLUOROMETHYLOXETANO(3',4';
  16α,17α) DERIVATIVES OF THE PREGNANE
  SERIES
John H. Fried, Palo Alto, Calif., assignor to Syntex Corporation, Panama, Panama, a corporation of Panama
No Drawing. Filed May 2, 1966, Ser. No. 546,549
15 Claims. (Cl. 260—239.55)

This invention relates to novel cyclopentanophenanthrene derivatives and to a process for the production thereof. More specifically, this invention relates to novel 2',2'-bistrifluoromethyloxetano(3',4';16α,17α) derivatives of the pregnane series.

The novel compounds of the present invention are represented by the following formulas:

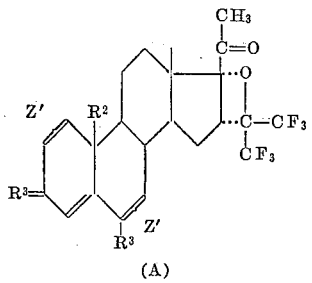

(A)

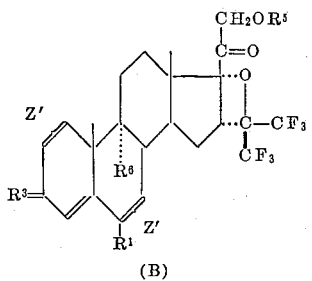

(B)

wherein
$R^1$ is hydrogen, chloro, fluoro or methyl;
$R^2$ is hydrogen or methyl;
$R^3$ is keto or the group

in which $R^4$ is hydrogen, tetrahydropyran-2-yl, tetrahydrofuran-2-yl or a hydrocarbon carboxylic acyl group of less than 12 carbon atoms; $R^3$ being keto when Z' is the carbon-carbon double bond;
$R^5$ is hydrogen, phosphono, tetrahydropyran-2-yl, tetrahydrofuran-2-yl or a hydrocarbon carboxylic acyl group of less than 12 carbon atoms;
$R^6$ is hydrogen or fluoro; and
each of Z and Z' is a carbon-carbon single bond or a carbon-carbon double bond, Z' being a carbon-carbon single bond when $R^2$ is hydrogen.

The hydrocarbon carboxylic acyl and acyloxy groups of the present invention will contain less than 12 carbon atoms and may be of a straight, branched, cyclic or cyclic-aliphatic chain structure. This structure may be saturated, unsaturated, or aromatic and optionally substituted by functional groups such as hydroxy, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

The phosphono group includes the mono or di-sodium or potassium salts thereof.

The novel compounds of the present invention as represented by Formula A are progestational agents and are useful in fertility control and the management of various menstrual disorders. The novel compounds as represented by Formula B are cortical hormones with high anti-inflammatory and low catabolic activities and are useful in the treatment of rheumatoid arthritis, contact dermatitis, allergies and the like. The compounds of the present invention may be administered via usual routes in the standard pharmaceutical compositions and at dosages appropriate for the particular condition being treated.

The compounds of the present invention are prepared in the following way.

The starting material is a 3,20-diketo-$\Delta^{4,16}$-diene of the pregnane series and may optionally contain a 6-chloro, fluoro or methyl group, a 9α-fluoro group, an 11β-hydroxy group, and a 21-acetoxy group.

In the practice of the process, a 3-keto-$\Delta^4$-ene group in the starting material is protected by formation of an ethylene ketal as for example, by treatment with 2-methyl-2-ethyl-1,3-dioxolane and p-toluenesulfonic acid to form a 3,3-ethylenedioxy group. With the protecting group intact, the compound in an inert organic solvent such as benzene, dioxane and the like, is irradiated with ultraviolet light of a wave length in the range of about 270 to about 330 mμ while bubbling hexafluoroacetone through the solution. Of these solvents, benzene is the preferred choice. Under these conditions, the hexafluoroacetone adds across the $\Delta^{16}$-double bond to afford the novel compounds, 2',2'-bistrifluoromethyloxetano(3',4';16α,17α) derivatives of the present invention. The orientation of the oxetano group with respect to the steroid nucleus is predominantly alpha. The reaction is usually complete within a period of one hour but in any event, its progress can be readily followed by observing the U.V. spectra of the reaction mixture.

Subsequent to the photochemical addition, the protecting ethylene ketal group at the 3-position is removed by hydrolysis under acidic conditions, such as with p-toluenesulfonic acid in acetone. The 21-acetoxy group is converted to a 21-hydroxy group by alkaline hydrolysis such as with potassium carbonate in methanol.

The 21-hydroxy derivatives are treated with methanesulfonyl chloride, and subsequently with sodium iodide, to afford a 21-iodo intermediate. This intermediate is allowed to react with silver monobasic phosphate in acetonitrile to yield the 21-phosphate compounds of the present invention. Alternatively, treatment of the 21-hydroxy compound with dihydropyran or dihydrofuran in the presence of an acidic catalyst such as p-toluenesulfonic acid or with a hydrocarbon carboxylic acid anhydride in the presence of pyridine leads to the formation of a 21-tetrahydropyran-2-yl, a 21-tetrahydrofuran-2-yl or 21-acyl derivatives, respectively.

Optionally, a $\Delta^{1,4}$-diene, a $\Delta^{4,6}$-diene or a $\Delta^{1,4,6}$-trien system may be introduced into the steroid nucleus subsequent to the photochemical addition of hexafluoroacetone. Thus, treatment of a 3-keto-$\Delta^4$-ene with 2,3-dichloro-5,6-dicyanobenzoquinone affords the $\Delta^{1,4}$-diene system. Alternatively, treatment of the 3-keto-$\Delta^4$-ene with chloranil in xylene affords the $\Delta^{4,6}$-diene system. Treatment of the $\Delta^{4,6}$-diene with chloranil in n-amyl alcohol affords the $\Delta^{1,4,6}$-triene system.

Selective reduction of a 3-keto-$\Delta^4$-ene or a 3-keto-$\Delta^{4,6}$-diene as for example, by treatment with sodium borohydride in isopropanol, and subsequent treatment with dihydropyran, dihydrofuran or with a hydrocarbon carboxylic acid anhydride, afford the corresponding 3β-(tetrahydropyran-2-yloxy), 3β-(tetrahydrofuran-2-yloxy), or 3β-acyloxy compounds of the present invention.

The following examples are set forth to illustrate but are not intended to limit the scope of the present invention.

PREPARATION A

To a suspension of 1 g. of 9α-fluoro-11β,17α-dihydroxy-21-acetoxypregn-4-ene-3,200-dione in 27 ml. of methanol and 1 ml. of water, under nitrogen is added 1.4 g. of semicarbazide hydrochloride and 0.74 g. of sodium bicarbondate. The mixture is heated at reflux for three hours and then at 45° C. for 20 hours. The suspension is cooled and 36 ml. of water are slowly added. The solid is collected by filtration, washed with water and dried to yield 9α-fluoro-11β,17α-dihydroxy-21-acetoxypreg-4-ene-3,20-bis-semicarbazone which is recrystallized from pyridine:methanol.

A solution of 1 g. of the latter material in 20 ml. of acetic acid and 1 ml. of acetic anhydride is heated at reflux under nitrogen for 1 hour. The reaction mixture is then concentrated under reduced pressure to a volume of about 12 ml. and treated with 6 ml. of water and 3 ml. of pyruvic acid. The mixture is allowed to stand at room temperature for 40 hours and at 60° C. for 2 hours and is then diluted with water and extracted with chloroform. These extracts are washed with water, dilute potassium bicarbonate solution and water, dried over mangesium sulfate and evaporated to dryness under reduced pressure. The residue is chromatographed on neutral alumina with benzene to yield 9α-fluoro-11β-hydroxy-21-acetoxypregna-4,16-diene-3,20-dione which may be recrystallized from acetone:ether.

Utilizing the same procedure, the following compounds, namely:

6α-chloro-17α-hydroxypregn-4-ene-3,20-dione;
6α-fluoro-17α-hydroxy-19-norpregn-4-ene-3,20-dione;
6α-methyl-17α-hydroxypregn-4-ene-3,20-dione;
6α-methyl-17α-hydroxy-19-norpregn-4-ene-3,20-dione;
17α-hydroxy-19-norpregn-4-ene-3,20-dione;
6α-fluoro-17α-hydroxypregn-4-ene-3,20-dione;
11β,17α-dihydroxy-21-acetoxypregn-4-ene-3,20-dione;
6α-methyl-9α-fluoro-11β,17α-dihydroxy-21-acetoxypregn-4-ene-3,20-dione;
6α-methyl-11β,17α-dihydroxy-21-acetoxy-pregn-4-ene-3,20-dione;
6α-methyl-11β,17α-dihydroxy-21-acetoxypregn-4-ene-3,20-dione;
6α-fluoro-11β,17α-dihydroxy-21-acetoxypregn-4-ene-3,20-dione;
6α,9α-difluoro-11β,17α-dihydroxy-21-acetoxypregn-4-ene-3,20-dione;
6α-chloro-17α-hydroxy-19-norpregn-4-ene-3,20-dione;
9α-fluoro-11β,17α-dihydroxy-21-acetoxypregn-4-ene-3,20-dione; and
6α-chloro-11β,17α-dihydroxy-21-acetoxypregn-4-ene-3,20-dione;

are converted to the 3,20-diketo-Δ$^{4,16}$ compounds used as starting materials for the present invention; namely:

6α-chloropregna-4,16-diene-3,20-dione;
6α-fluoro-19-norpregna-4,16-diene-3,20-dione;
6α-methylpregna-4,16-diene-3,20-dione;
6α-methyl-19-norpregna-4,16-diene-3,20-dione;
19-norpregna-4,16-diene-3,20-dione;
6α-fluoropregna-4,16-diene-3,20-dione;
11β-hydroxy-21-acetoxypregna-4,16-diene-3,20-dione;
6α-methyl-9α-fluoro-11β-hydroxy-21-acetoxy-pregna-4,16-diene-3,20-dione;
6α-methyl-11β-hydroxy-21-acetoxypregna-4,16-diene-3,20-dione;
6α-fluoro-11β-hydroxy-21-acetoxypregna-4,16-diene-3,20-dione;
6α,9α-difluoro-11β-hydroxy-21-acetoxypregna-4,16-diene-3,20-dione;
6α-chloro-19-norpregna-4,16-diene-3,20-dione;
9α-fluoro-11β-hydroxy-21-acetoxypregna-4,16-diene-3,20-dione; and
6α-chloro-11β-hydroxy-21-acetoxypregna-4,16-diene-3,20-dione.

Example 1

A mixture of 2 g. of 16-dehydroprogesterone in 30 ml. of 2-methyl-2-ethyl-1,3-dioxolane and 70 mg. of p-toluenesulfonic acid is heated at reflux with distillation for one hour. The mixture is then cooled, diluted with water and extracted with ethyl acetate. The extracts are washed to neutrality, dried and evaporated to dryness to yield 3,3-ethylenedioxypregna-5,16-diene-3,20-dione which is recrystallized from acetone-hexane.

A mixture of 2.0 g. of the above material in 140 ml. of benzene is irradiated with a 70 watt Hanau high pressure mercury vapor lamp with a Pyrex filter at room temperature while bubbling hexafluoroacetone through the solution. At the end of the reaction time, which may be followed by observing the U.V. spectrum, the solvent is evaporated under reduced pressure and the reaction product is chromatographed on silica eluting with ethyl acetate:benzene to yield 2′,2′-bistrifluoromethyloxetano(3′,4′;16α,17α)-3,3-ethylenedioxypregn-5-en-20-one.

A mixture of 0.5 of the latter compound in 30 ml. of acetone and 50 mg. of p-toluenesulfonic acid is allowed to stand at room tempertaure for 15 hours. It is then poured into ice water and extracted with ethyl acetate. These extracts are washed with water to neutrality, dried over sodium sulfate and evaporated to dryness. The residue is triturated with ether to yield 2′,2′-bistrifluoromethyloxetano(3′,4′;16α,17α)-pregn-4-ene-3,20-dione which is recrystallized from acetone:hexane.

Utilizing the same procedure, the following starting materials, namely;

6α-chloropregna-4,16-diene-3,20-dione;
6α-chloro-19-norpregna-4,16-diene-3,20-dione;
6α-methylpregna-4,16-diene-3,20-dione;
6α-methyl-19-norpregna-4,16-diene-3,20-dione;
19-norpregna-4,16-diene-3,20-dione;
6α-fluoropregna-4,16-diene-3,20-dione;
11β-hydroxy-21-acetoxypregna-4,16-diene-3,20-dione;
9α-fluoro-11β-hydroxy-21-acetoxypregna-4,16-diene-3,20-dione;
6α-methyl-9α-fluoro-11β-hydroxy-21-acetoxypregna-4,16-diene-3,20-dione;
6α-methyl-11β-hydroxy-21-acetoxypregna-4,16-diene-3,20-dione;
6α-fluoro-11β-hydroxy-21-acetoxypregna-4,16-diene-3,20-dione; and
6α,9α-difluoro-11β-hydroxy-21-acetoxypregna-4,16-diene-3,20-dione;

are converted to the 2′,2′-bistrifluoromethyloxetano(3′,4′;16α,17α) compounds of the present invention, namely:

2′,2′-bistrifluoromethyloxetano(3′,4′;16α,17α)-6α-chloropregn-4-ene-3,20-dione;
2′,2′-bistrifluoromethyloxetano(3′,4′;16α,17α)-6α-chloro-19-norpregn-4-ene-3,20-dione;
2′,2′-bistrifluoromethyloxetano(3′,4′;16α,17α)-6α-methylpregn-4-ene-3,20-dione;
2′,2′-bistrifluoromethyloxetano(3′,4′;16α,17α)-6α-methyl-19-norpregn-4-ene-3,20-dione;
2′,2′-bistrifluoromethyloxetano(3′,4′;16α,17α)-19-norpregn-4-ene-3,20-dione;
2′,2′-bistrifluoromethyloxetano(3′,4′;16α,17α)-6α-fluoropregn-4-ene-3,20-dione;
2′,2′-bistrifluoromethyloxetano(3′,4′;16α,17α)-11β-hydroxy-21-acetoxypregn-4-ene-3,20-dione;
2′,2′-bistrifluoromethyloxetano(3′,4′;16α,17α)-9α-fluoro-11β-hydroxy-21-acetoxypregn-4-ene-3,20-dione;
2′,2′-bistrifluoromethyloxetano(3′,4′;16α,17α)-6α-methyl-9α-fluoro-11β-hydroxy-21-acetoxypregn-4-ene-3,20-dione;
2′,2′-bistrifluoromethyloxetano(3′,4′;16α,17α)-6α-methyl-11β-hydroxy-21-acetoxypregn-4-ene-3,20-dione;
2′,2′-bistrifluoromethyloxetano(3′,4′;16α,17α)-6α-fluoro-11β-hydroxy-21-acetoxypregn-4-ene-3,20-dione; and
2′,2′-bistrifluoromethyloxetano(3′,4′;16α,17α)-6α,9α-difluoro-11β-hydroxy-21-acetoxypregn-4-ene-3,20 - dione; respectively.

Example 2

A mixture of 1 g. of 2′,2′-bistrifluoromethyloxetano(3′,4′; 16α,17α)-pregn-4-ene-3,20-dione, 2 g. of chloranil and 10 ml. of xylene is refluxed under an atmosphere of nitrogen for 16 hours. The mixture is cooled, washed with a cold 10% sodium hydroxide solution and then with water, dried over sodium sulfate and evaporated under reduced pressure. The residue is chromatographed on neutral alumina and further purified through recrystallization from acetone:hexane to yield 2′,2′-bistrifluoromethyloxetano(3′,4′;16α,17α)-pregna-4,6-diene-3,20-dione.

Utilizing the same procedure, the 2′,2′-bistrifluoromethyloxetano(3′,4′;16α,17α) compounds prepared as final products in Example 1 are converted to the Δ$^{4,6}$ compounds. Notably among these are the following:

2′,2′-bistrifluoromethyloxetano(3′,4′;16α,17α)-6-chloropregna-4,6-diene-3,20-dione;
2′,2′-bistrifluoromethyloxetano(3′,4′;16α,17α)-6-chloro-19-norpregna-4,6-diene-3,20-dione;
2′,2′-bistrifluoromethyloxetano(3′,4′;16α,17α)-6-methylpregna-4,6-diene-3,20-dione;
2′,2′-bistrifluoromethyloxetano(3′,4′;16α,17α)-6-methyl-19-norpregna-4,6-diene-3,20-dione;
2′,2′-bistrifluoromethyloxetano(3′,4′;16α,17α)-19-norpregna-4,6-diene-3,20-dione;
2′,2′-bistrifluoromethyloxetano(3′,4′;16α,17α)-6-fluoropregna-4,6-diene-3,20-dione;
2′,2′-bistrifluoromethyloxetano(3′,4′;16α,17α)-11β-hydroxy-21-acetoxypregna-4,6-diene-3,20-dione;
2′,2′-bistrifluoromethyloxetano(3′,4′;16α,17α)-9α-fluoro-11β-hydroxy-21-acetoxypregna-4,6-diene-3,20-dione;
2′,2′-bistrifluoromethyloxetano(3′,4′;16α,17α)-6-methyl-9α-fluoro-11β-hydroxy-21-acetoxypregna-4,6-diene-3,20-dione;
2′,2′-bistrifluoromethyloxetano(3′,4′;16α,17α)-6-methyl-11β-hydroxy-21-acetoxypregna-4,6-diene-3,20-dione;
2′,2′-bistrifluoromethyloxetano(3′,4′;16α,17α)-6-fluoro-11β-hydroxy-21-acetoxypregna-4,6-diene - 3,20 - dione; and
2′,2′-bistrifluoromethyloxetano(3′,4′;16α,17α)-6-9α-difluoro-11β-hydroxy-21-acetoxypregna-4,6-diene-3,20-dione, respectively.

Example 3

A mixture of 0.5 g. of 2′,2′-bistrifluoromethyloxetano (3′4′;16α,17α)-pregn-4-ene-3,20-dione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 2′,2′-bistrifluoromethyloxetano(3′,4′;16α,17α)-pregna - 1,4 - diene-3,20-dione which is further purified by recrystallization from acetone:hexane.

Utilizing the same procedure, the following starting materials, namely:

2′,2′-bistrifluoromethyloxetano(3′,4′;16α,17α)-6α-chloropregn-4-ene-3,20-dione;
2′,2′-bistrifluoromethyloxetano(3′,4′;16α,17α)-6α-methylpregn-4-ene-3,20-dione;
2′,2′-bistrifluoromethyloxetano(3′,4′;16α,17α)-6α-fluoropregn-4-ene-3,20-dione;
2′,2′-bistrifluoromethyloxetano(3′,4′;16α,17α)-11β-hydroxy-21acetoxypregna-4-ene-3,20-dione;
2′,2′-bistrifluoromethyloxetano(3′,4′;16α,17α)-9α-fluoro-11β-hydroxy-21-acetoxypregn-4-ene-3,20-dione;
2′,2′-bistrifluoromethyloxetano(3′,4′;16α,17α)-6α-methyl-9α-fluoro-11β-hydroxy-21-acetoxypregn-4-ene-3,20-dione;
2′,2′-bistrifluoromethyloxetano(3′,4′;16α,17α)-6α-methyl-11β-hydroxy-21-acetoxypregna-4-ene-3,20-dione;
2′,2′-bistrifluoromethyloxetano(3′,4′;16α,17α)-6α-fluoro-11β-hydroxy-21-acetoxypregna-4-ene-3,20-dione; and
2′,2′-bistrifluoromethyloxetano(3′,4′;16α,17α)-6α,9α-fluoro-11β-hydroxy-21-acetoxypregna-4-ene-3,20-dione;

are converted to the corresponding final products, namely 2,2′-bistrifluoromethyloxetano(3′,4′;16α,17α)-6α-chloropregna-1,4-diene-3,20-dione;
2′,2′-bistrifluoromethyloxetano(3′,4′;16α,17α)-6α-methylpregna-1,4-diene-3,20-dione;
2′,2′-bistrifluoromethyloxetano(3,4;16α,17α)-6α-fluoropregna-1,4-diene-3,20-dione;
2′,2′-bistrifluoromethyloxetano(3′,4′;16α,17α)-11β-hydroxy-21-acetoxypregna-1,4-diene-3,20-dione;
2′,2′-bistrifluoromethyloxetano(3′,4′;16α,17α)-9α-fluoro-11β-hydroxy-21acetoxypregna-1,4-diene-3,20-dione;
2′,2′-bistrifluoromethyloxetano(3′,4′;16α,17α)-6α-methyl-9α-fluoro-11β-hydroxy-21-acetoxypregna-1,4-diene-3,20-dione;
2′,2′-bistrifluoromethyloxetano(3′,4′;16α,17α)-6α-methyl-11β-hydroxy-21-acetoxypregna-1,4-diene-3,20-dione;
2′,2′-bistrifluoromethyloxetano(3′,4′;16α,17α)-6α-fluoro-11β-hydroxy-21-acetoxypregna-1,4-diene-3,20-dione; and
2′,2′-bistrifluoromethyloxetano(3,4′;16α,17α)-6α,9α-fluoro-11β-hydroxy-21-acetoxypregna-1,4-diene-3,20-dione, respectively.

Example 4

A solution of 200 mg. of 2′,2′-bistrifluoromethyloxetano(3′,4′;16α,17α)-pregn-4-ene-3,20-dione in 32 ml. of anhydrous isopropanol and 25 mg. of sodium borohydride is stirred at room temperature for 15 hours. One-hundred ml. of water are added and the resulting suspension extracted several times with ether. The ether phase is dried over sodium sulfate and evaporated to dryness under reduced pressure to yield 2′,2′-bistrifluoromethyloxetano(3′,4′;16α,17α)-3β-hydroxypregn-4-en-20-one which may be further purified by recrystallization from ether.

Two milliliters of dihydropyran are added to a solution of 1 g. of the latter material in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 2′,2′-bistrifluoromethyloxetano(3′,4′;16α,17α)-3β-(tetrahydropyran - 2 - yloxy)-pregn-4-en-20-one which is recrystallized from pentane.

Utilizing the same procedure, the following starting materials, namely

2′,2′-bistrifluoromethyloxetano(3′,4′;16α,17α)-6-chloropregna-4,6-diene-3,20-dione;
2′,2′-bistrifluoromethyloxetano(3′,4′;16α,17α)-6-chloro-19-norpregna-4,6-diene-3,20-dione;
2′,2′-bistrifluoromethyloxetano(3′,4′;16α,17α)-6α-fluoropregn-4-ene-3,20-dione;
2′,2′-bistrifluoromethyloxetano(3′,4′;16α,17α)-6α-methylpregn-4-ene-3,20-dione;
2′,2′-bistrifluoromethyloxetano(3′,4′;16α,17α)-6-methylpregna-4,6-diene-3,20-dione;
2′,2′-bistrifluoromethyloxetano(3′,4′;16α,17α)-11β-hydroxy-21-acetoxypregna-4,6-diene-3,20-dione;
2′,2′-bistrifluoromethyloxetano(3′,4′;16α,17α)-6α,9α-difluoro-11β-hydroxy-21-acetoxypregna-4-ene-3,20-dione;
2′,2′-bistrifluoromethyloxetano(3′,4′;16α,17α)-9α-fluoro-11β-hydroxy-21-acetoxypregn-4-ene-3,20-dione;
2′,2′-bistrifluoromethyloxetano(3′,4′;16α,17α)-6α-fluoro-11β-hydroxy-21-acetoxypregn-4-ene-3,20-dione; and
2′,2′-bistrifluoromethyloxetano(3′,4′;16α,17α)-6α-methyl-11β-hydroxy-21-acetoxypregn-4-ene-3,20-dione;

are converted to the corresponding 3β-(tetrahydropyran-2-yloxy) compounds, namely:

2',2'-bistrifluoromethyloxetano(3',4';16α,17α)-3β-(tetrahydropyran-2-yloxy)-6-chloropregna-4,6-diene-3,20-dione;

2',2'-bistrifluoromethyloxetano(3',4';16α,17α)-3β-(tetrahydropyran-2-yloxy)-6-chloro-19-norpregna-4,6-diene-3,20-dione;

2',2'-bistrifluoromethyloxetano(3',4';16α,17α)-3β-(tetrahydropyran-2-xyloxy)-6α-fluoropregn-4-ene-3,20-dione;

2',2'-bistrifluoromethyloxetano(3',4';16α,17α)-3β-(tetrahydropyran-2-xyloxy)-6α-methylpregn-4-ene-3,20-dione;

2',2'-bistrifluoromethyloxetano(3',4';16α,17α)-3β-(tetrahydropyran-2-yloxy)-6-methylpregna-4,6-diene-3,20-dione;

2',2'-bistrifluoromethyloxetano(3',4';16α,17α)-3β-(tetrahydropyran-2-yloxy)-11β-hydropy-21-acetoxypregna-4,6-diene-3,20-dione;

2',2'-bistrifluoromethyloxetano(3',4';16α,17α)-3β-(tetrahydropyran-2-yloxy)-6α,9α-difluoro-11β-hydroxy-21-acetoxypregn-4-ene-3,20-dione;

2',2'-bistrifluoromethyloxetano(3',4';16α,17α)-3β-(tetrahydropyran-2-yloxy)-9α-fluoro-11β-hydroxy-21-acetoxypregn-4-ene-3,20-dione;

2',2'-bistrifluoromethyloxetano(3',4';16α,17α)-3β-(tetrahydropyran-2-yloxy)-6α-fluoro-11β-hydroxy-21-acetoxypregn-4-ene-3,20-dione; and 2',2'-bistrifluoromethyloxetano(3',4';16α,17α)-3β-(tetrahydropyran-2-yloxy)-6α-methyl-11β-hydroxy-21-acetoxypregn-4-ene-3,20-dione, respectively.

Utilizing the same procedure and starting materials, with one exception, namely substituting dihydrofuran in place of dihydropyran, there are obtained the corresponding 3β-(tetrahydrofuran-2-yloxy) compounds.

Example 5

A solution of 200 mg. of 2',2'-bistrifluoromethyloxetano (3',4'; 16α,17α)-6-chloropregna-4,6-diene-3,20-dione in 32 ml. of anhydrous isopropanol and 25 mg. of sodium borohydride is stirred at room temperature for 15 hours. One hundred ml. of water is added and the resulting suspension extracted several times with ether. The ether phase is dried over sodium sulfate and evaporated to dryness under reduced pressure to yield 2',2'-bistrifluoromethyloxetano(3',4';16α,17α)-3β-hydroxy-6 - chloropregna - 4,6-dien-20-one which may be further purified by recrystallization from ether.

A mixture of 1 g. of the above compound, 4 ml. of pyridine and 2 ml. of acetic anhydride is allowed to stand at room temperature for 15 hours. The mixture is then poured into ice water and the solid which forms is collected by filtration, washed with water and dried to yield 2',2'-bistrifluoromethyloxetano(3',4';16α,17α) - 3β - acetoxy-6-chloropregna-4,6-dien-20-one which may be further purified through recrystallization from acetone:hexane.

Utilizing the same procedure and starting material, with one exception, namely substituting propionic anhydride, caproic anhydride, enanthic anhydride and cyclopentylpropionic anhydride in place of acetic anhydride, there are obtained the corresponding 3β-propionate, 3β-caproate, 3β-enanthate, and 3β-cyclopentylpropionate compounds.

Example 6

A suspension of 1 g. of 2',2'-bistrifluoromethyloxetano-(3',4';16α,17α) - 11β - hydroxy - 21 - acetoxypregn-4-ene-3,20-dione in 60 ml. of methanol is treated with a solution of 1 g. of potassium carbonate in 6 ml. of water. The mixture is heated at reflux for one hour, cooled in ice and diluted with water. The solid which forms is collected by filtration, washed with water and dried to yield 2',2' - bistrifluoromethyloxentano(3',4';16α,17α) - 11β,21-dihydroxypregn-4-ene-3,20-dione which is recrystallized from acetone:hexane.

Two milliliters of dihydropyran are added to a solution of 1 g. of the above material in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 2',2'-bistrifluoromethyloxetano-(3',4';16α,17α)-11β-hydroxy-21 - (tetrahydropyran-2-yloxy)-pregn-4-ene-3,20-dione which is recrystallized from pentane.

Utilizing the same procedure, the following starting materials, namely

2',2'-bistrifluoromethyloxetano(3',4';16α,17α)-11β-hydroxy-21-acetoxypregna-1,4-diene-3,20-dione;

2',2'-bistrifluoromethyloxetano(3',4';16α,17α)-6α,9α-difluoro-11β-hydroxy-21-acetoxypregna-1,4-diene-3,20-dione;

2',2'-bistrifluoromethyloxetano(3',4';16α,17α)-9α-fluoro-11β-hydroxy-21-acetoxypregn-4-ene-3,20-dione;

2',2'-bistrifluoromethyloxetano(3',4';16α,17α)-6-methyl-11β-hydroxy-21-acetoxypregna-4,6-diene-3,20-dione; and 2',2'-bistrifluoromethyloxetano(3',4';16α,17α)-6α-methyl-9α-fluoro-11β-hydroxy-21-acetoxypregn-4-ene-3,20-dione; are converted to the corresponding 21-(tetrahydropyran-2-yloxy) final products, namely 2',2'-bistrifluoromethyloxetano(3',4';16α,17α)-11β-hydroxy-21-(tetrahydropyran-2-yloxy)-pregna-1,4-diene-3,20-dione;

2',2'-bistrifluoromethyloxetano(3',4';16α,17α)-6α,9α-difluoro-11β-hydroxy-21-(tetrahydropyran-2-yloxy)-pregna-1,4-diene-3,20-dione;

2',2'-bistrifluoromethyloxetano(3',4';16α,17α)-9α-fluoro-11β-hydroxy-21-(tetrahydropyran-2-yloxy)-pregn-4-ene-3,20-dione;

2',2'-bistrifluoromethyloxetano(3',4';16α,17α)-6-methyl-11β-hydroxy-21-(tetrahydropyran-2yloxy)-pregna-4,6-diene-3,20-dione;

2',2'-bistrifluoromethyloxetano(3',4';16α,17α)-6α-methyl-9α-fluoro-11β-hydroxy-21-(tetrahydropyran-2-yloxy)-pregn-4-ene-3,20-dione, respectively.

Utilizing the same procedure and starting material, with one exception, namely substituting dihydrofuran in place of dihydropyran, there are obtained the corresponding 21-(tetrahydrofuran-2-yloxy) compounds.

Example 7

A suspension of 1 g. of 2',2'-bistrifluoromethyloxetano-(3',4';16α,17α)-6α,9α-difluoro-11β-hydroxy - 21 - acetoxypregna-1,4-diene-3,20-dione in 60 ml. of methanol is treated with a solution of 1 g. of potassium carbonate in 6 ml. of water. The mixture is heated at reflux for one hour, cooled in ice and diluted with water. The solid which forms is collected by filtration, washed with water and dried to yield 2',2' - bistrifluoromethyloxetano(3',4'; 16α,17α)-6α-difluoro-11β,21 - dihydroxypregna-1,4-diene-3,20-dione which is recrystallized from acetone:hexane.

A mixture of 1 g. of the above compound, 4 ml. of pyridine and 2 ml. of propionic anhydride is allowed to stand at room temperature for 15 hours. The mixture is then poured into ice water and the solid which forms is collected by filtration, washed with water and dried to yield 2',2 - bistrifluoromethyloxetano(3',4';16α,17α) - 6α,9α-difluoro-11β-hydroxy - 21 - propionoxypregna - 1,4-diene-3,20-dione which may be further purified through recrystallization from acetone:hexane.

Utilizing the same procedure and starting material, with one exception, namely substituting enanthic anhydride and then cyclopentylpropionic anhydride, there are obtained the corresponding 21-enanthate and 21-cyclopentylpropionate compounds.

Example 8

A mixture of 2 g. of 2',2'-bistrifluoromethyloxetano (3',4';16α,17α)-6α,9α - difluoro - 11β,21-dihydroxypregna- 1,4-diene-3,20-dione in 8 ml. of pyridine and 4 ml. of trimethylacetyl chloride is headed at steam bath temperatures for one hour. The mixture is then poured into ice water. The solid which forms is collected by filtration, washed with water and dried to yield 2',2'-bistrifluoromethyloxetano(3',4';16α,17α) - 6α,9α - difluoro-11β-hydroxy - 21 - trimethylacetoxypregna-1,4-diene-3,20-dione which may be recrystallized from methylene chloride:hexane.

In a similar fashion, other 21-hydroxy compounds prepared in Examples 6 and 7, are converted to the corresponding 21-trimethylacetoxy compounds.

Example 9

To a cooled solution (0° C.) of 3.4 g. of 2',2'-bistrifluoromethyloxetano(3',4';16α,17α) - 6α,9α - difluoro-11β,21-dihydroxypregna - 1,4 - diene-3,20-dione in 20 ml. of 9:1 chloroform:pyridine is added in small portions 1.4 g. of methanesulfonyl chloride. The reaction mixture is allowed to stand for 14 hours at 0° C. and is then washed with dilute hydrochloric acid, water and sodium bicarbonate solution. The chloroform is removed by evaporation under reduced pressure and the residue is dissolved in 20 ml. of acetone treated at room temperature and under stirring with 4 g. of sodium iodide. Sodium thiosulfate solution is added, followed by water. The solid is collected and dried to yield 2',2'-bistrifluoromethyloxetano (3',4';16α,17α)-6α,9α-difluoro - 11β - hydroxy-21-iodopregna-1,4-diene-3,20-dione. A mixture of 1 g. of the above 21-iodo intermediate and 1.1 molar equivalents of silver monobasic phosphate in 60 ml. of acetonitrile is heated at reflux for 2 hours. The mixture is then filtered and evaporated to dryness of yield 2',2'-bistrifluoromethyloxetano(3',4';16α,17α) - 6α,9α - difluoro-11β-hydroxy-21-phosphatopregna - 1,4 - diene-3,20-dione which may be crystallized from methanol ethyl acetate. This product, dissolved in methanol, may be triturated with aqueous sodium hydroxide to yield corresponding monosodium and disodium salts. In a similar fashion, potassium hydroxide affords the monopotassium and dipotassium salts.

In a similar fashion, other 21-hydroxy compounds of the present invention are converted to the corresponding 21-iodo intermediates and then to the corresponding 21-phosphate compounds.

Example 10

A mixture of 1 g. of 2',2'-bistrifluoromethyloxetano (3',4';16α,17α)-pregna - 4,6 - diene-3,20-dione, 2 g. of chloranil and 10 ml. of n-amyl alcohol are refluxed under nitrogen for 24 hours. The mixture is then cooled, washed with a cold aqueous solution of 10% sodium hydroxide until the washings were colorless, dried over sodium sulfate and evaporated. Chromatography of the residue on neutral alumina yields 2',2' - bistrifluoromethyloxetano (3',4'; 16α,17α)-pregna - 1,4,6, - triene-3,20-dione which may be further purified through recrystallization from acetone:hexane.

Utlizing the same procedure, other 2',2'-bistrifluoromethyloxetano(3',4';16α,17α) - pregna - 4,6 - dienes are converted to the corresponding Δ$^{1,4,6}$,-trienes. Notably among these are the following:

2',2'-bistrifluoromethyloxetano(3',4';16α,17α)-6-chloropregna-1,4,6-triene-3,20-dione;

2',2'-bistrifluoromethyloxetano(3',4';16α,17α)-6-methylpregna-1,4,6-triene-3,20-dione;

2',2'-bistrifluoromethyloxetano(3',4';16α,17α)-6-fluoropregna-1,4,6-triene-3,20-dione;

2',2'-bistrifluoromethyloxetano(3',4';16α,17α)-6-methyl-11β,21-dihydroxypregna-1,4,6,-triene-3,20-dione;

2',2'-bistrifluoromethyloxetano(3',4';16α,17α)-6-methyl-9α-fluoro-11β,21-dihydroxypregna-1,4,6,-triene-3,20-dione;

2',2'-bistrifluoromethyloxetano(3',4';16α,17α)-6-fluoro-11β,21-dihydroxypregna-1,4,6,-triene-3,20-dione;

2',2'-bistrifluoromethyloxetano(3',4';16α,17α)-6,9α-difluoro-11β,21-dihydroxypregna-1,4,6,-triene-3,20-dione;

2',2'-bistrifluoromethyloxetano(3',4';16α,17α)-6-methyl-11β-hydroxy-21-acetoxypregna-1,4,6,-triene-3,20-dione;

2',2'-bistrifluoromethyloxetano-(3',4';16α,17α)-6-methyl-9α-fluoro-11β-hydroxy-21-acetoxypregna-1,4,6,-triene-3,20-dione;

2',2'-bistrifluoromethyloxetano(3',4';16α,17α)-6-fluoro-11β-hydroxy-21-acetoxypregna-1,4,6,-triene-3,20-dione; and 2',2'-bistrifluoromethyloxetano-(3',4';16α,17α)-6,9α-difluoro-11β-hydroxy-21-acetoxypregna-1,4,6,-triene-3,20-dione.

Example 11

A suspension of 1 g. of 2',2'-bistrifluoromethyloxetano (3',4';16α,17α) - 11β - hydroxy - 21 - acetoxypregna-1,4-diene-3,20-dione in 60 ml. of methanol is treated with a solution of 1 g. of potassium carbonate in 6 ml. of water. The mixture is heated at reflux for one hour, cooled in ice and diluted with water. The solid which forms is collected by filtration, washed with water and dried to yield 2',2'-bistrifluoromethyloxetano(3',4';16α,17α) - 11β,21 - dihydroxypregna-1,4-diene-3,20-dione which is recrystallized from acetone:hexane.

Utilizing the same procedure, other 21-acetoxy compounds of the present invention are converted to the corresponding 21-hydroxy compounds. Notably among these are the following:

2',2'-bistrifluoromethyloxetano(3',4';16α,17α)-11β,21-dihydroxypregn-4-ene-3,20-dione;

2',2'-bistrifluoromethyloxetano(3',4';16α,17α)-6α-fluoro-11β,21-dihydroxypregn-4-ene-3,20-dione;

2',2'-bistrifluoromethyloxetano(3',4';16α,17α)-6α-methyl-11β,21-dihydroxypregn-4-ene-3,20-dione;

2',2'-bistrifluoromethyloxetano(3',4';16α,17α)-9α-fluoro-11β,21-dihydroxypregn-4-ene-3,20-dione;

2',2'-bistrifluoromethyloxetano(3',4';16α,17α)-11β,21-dihydroxypregna-1,4-diene-3,20-dione;

2',2'-bistrifluoromethyloxetano(3',4';16α,17α)-6α-methyl-11β,21-dihydroxypregna-1,4-diene-3,20-dione;

2',2'-bistrifluoromethyloxetano(3',4';16α,17α)-6α-methyl-9α-fluoro-11β,21-dihydroxypregna-1,4-diene-3,20-dione;

2',2'-bistrifluoromethyloxetano(3',4';16α,17α)-6α,9α-difluoro-11β,21-dihydroxypregna-1,4-diene-3,20-dione;

2',2'-bistrifluoromethyloxetano(3',4';16α,17α)-6-methyl 11β,21-dihydroxypregna-4,6-diene-3,20-dione;

2',2'-bistrifluoromethyloxetano(3',4';16α,17α)-6-methyl-11β,21-dihydroxypregna-1,4,6-triene-3,20-dione;

2',2'-bistrifluoromethyloxetano(3',4';16α,17α)-6-methyl-9α-fluoro-11β,21-dihydroxypregna-4,6-diene-3,20-dione; and 2',2'-bistrifluoromethyloxetano(3',4';16α,17α)-6-methyl-9α-fluoro-11β,21-dihydroxypregna-1,4,6-triene-3,20-dione.

What is claimed is:

1. A compound according to the formula:

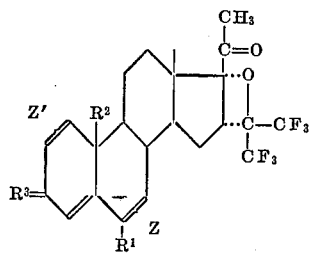

wherein $R^1$ is hydrogen, chloro, fluoro, or methyl;
$R^2$ is hydrogen or methyl;
$R^3$ is keto or the group

in which $R^4$ is hydrogen, tetrahydropyran-2-yl, tetrahydrofuran-2-yl, or a hydrocarbon carboxylic acyl group of less than 12 carbon atoms, $R^3$ being keto when $Z'$ is a carbon-carbon double bond;
each of Z and $Z'$ is a carbon-carbon single bond or a carbon-carbon double bond, $Z'$ being a carbon-carbon single bond when $R^2$ is hydrogen.

2. A compound according to claim 1 wherein $R^1$ is hydrogen or α-methyl; $R^2$ is methyl; $R^3$ is keto; each of Z and $Z'$ is a carbon-carbon single bond.

3. A compound according to claim 1 wherein $R^1$ is hydrogen or α-methyl; $R^2$ is methyl; $R^3$ is keto; Z is a carbon-carbon single bond; $Z'$ is a carbon-carbon double bond.

4. A compound according to claim 1 wherein $R^1$ is chloro; $R^2$ is methyl; $R^3$ is keto; Z is a carbon-carbon double bond; $Z'$ is a carbon-carbon single bond.

5. A compound according to claim 1 wherein $R^1$ is chloro; $R^2$ is methyl; $R^3$ is keto; each of Z and $Z'$ is a carbon-carbon double bond.

6. A compound according to claim 1 wherein $R^1$ is chloro; $R^2$ is hydrogen; $R^3$ is keto; Z is a carbon-carbon double bond; $Z'$ is a carbon-carbon single bond.

7. A compound according to the formula:

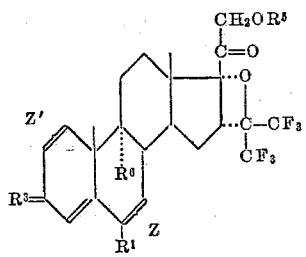

wherein $R^1$ is hydrogen, chloro, fluoro or methyl;
$R^3$ is keto or the group

in which $R^4$ is hydrogen, tetrahydropyran-2-yl, tetrahydrofuran-2-yl, or a hydrocarbon acyl group of less than 12 carbon atoms; $R^3$ being keto when $Z'$ is a carbon-carbon double bond;

$R^5$ is hydrogen, phosphono, tetrahydropyran-2-yl, tetrahydrofuran-2-yl, or a hydrocarbon carboxylic acyl group containing less than 12 carbon atoms;
$R^6$ is hydrogen or fluoro;
each of Z and $Z'$ is a carbon-carbon single bond or a carbon-carbon double bond.

8. A compound according to claim 7 wherein $R^1$ is hydrogen or α-methyl; $R^3$ is keto; $R^5$ is hydrogen or acetyl; $R^6$ is hydrogen; Z is a carbon-carbon single bond; $Z'$ is a carbon-carbon single bond or a carbon-carbon double bond.

9. A compound according to claim 7 wherein $R^1$ is hydrogen or α-methyl; $R^3$ is keto; $R^5$ is hydrogen or acetyl; $R^6$ is fluoro; Z is a carbon-carbon single bond; $Z'$ is a carbon-carbon single bond or a carbon-carbon double bond.

10. A compound according to claim 7 wherein $R^1$ is α-fluoro; $R^3$ is keto; $R^5$ is hydrogen or acetyl; $R^6$ is hydrogen; Z is a carbon-carbon single bond; $Z'$ is a carbon-carbon single bond or a carbon-carbon double bond.

11. A compound according to claim 7 wherein $R^1$ is fluoro; $R^3$ is keto; $R^5$ is hydrogen or acetyl; $R^6$ is α-fluoro; Z is a carbon-carbon single bond; $Z'$ is a carbon-carbon single bond or a carbon-carbon double bond.

12. A compound according to claim 7 wherein $R^1$ is methyl; $R^3$ is keto; $R^5$ is hydrogen or acetyl; $R^6$ is hydrogen; Z is a carbon-carbon double bond; $Z'$ is a carbon-carbon single bond or a carbon-carbon double bond.

13. A compound according to claim 7 wherein $R^1$ is methyl; $R^3$ is keto; $R^5$ is hydrogen or acetyl; $R^6$ is fluoro; Z is a carbon-carbon double bond; $Z'$ is a carbon-carbon single bond or a carbon-carbon double bond.

14. A compound according to claim 1 wherein $R^1$ is hydrogen or methyl; $R^2$ is methyl; $R^3$ is keto; Z is a carbon-carbon double bond; $Z'$ is a carbon-carbon single bond.

15. A compound according to claim 1 wherein $R^1$ is hydrogen or methyl; $R^2$ is methyl; $R^3$ is keto; each of Z and $Z'$ is a carbon-carbon double bond.

References Cited

Pike, J. E., Journal of Organic Chemistry, vol. 29, 1964, pps. 3476–3481.

LEWIS GOTTS, *Primary Examiner.*

E. G. LOVE, *Assistant Examiner.*

UNITED STATES PATENT OFFICE
CERTIFICATE OF CORRECTION

Patent No. 3,377,343                                      April 9, 1968

John H. Fried

It is certified that error appears in the above identified patent and that said Letters Patent are hereby corrected as shown below:

Column 1, lines 17 to 27, the left-hand portion of the formula should appear as shown below:

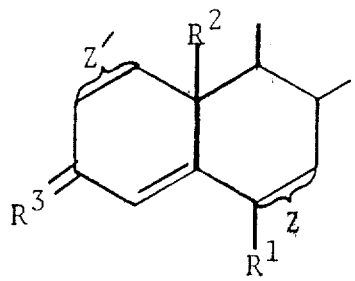

same column 1, lines 28 to 40, the left-hand portion of the formula should appear as shown below:

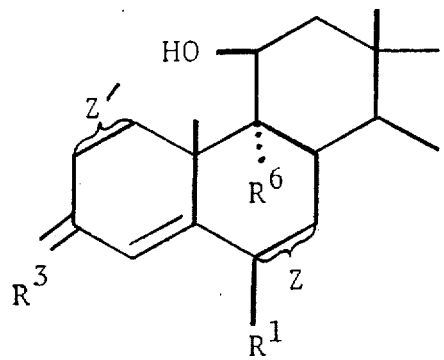

Column 4, line 20, after "0.5" insert -- g. --. Column 5, line 67, "-21acetoxypregna-" should read -- -21-acetoxypregn- --; line 74, and column 6, lines 1 and 3, "-21-acetoxypregna-", each occurrence, should read -- -21-acetoxypregn- --. Column 7, line 16, "hydropy" should read -- hydroxy --; line 71, "bistrifluoromethyloxentano" should read -- bistrifluoromethyloxetano- --. Column 8, line 56, "-6α-" should read -- -6α,9α- --; line 63, "2´,2-bistrifluoromethyloxetano" should read --

2′,2′-bistrifluoromethyloxetano- --.  Column 9, line 2, "headed" should read -- heated --; line 33, "of" should read -- to --. Column 11, lines 31 to 40, the portion of the formula reading

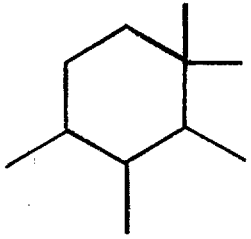     should read     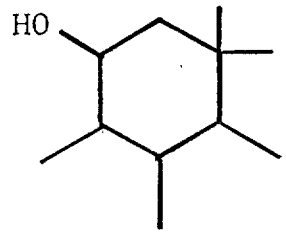

Signed and sealed this 3rd day of March 1970.

(SEAL)
Attest:

EDWARD M. FLETCHER, JR.
Attesting Officer

WILLIAM E. SCHUYLER, JR.
Commissioner of Patents